United States Patent [19]

Kinstle

[11] 3,929,935
[45] Dec. 30, 1975

[54] ELECTRON BEAM CURABLE COATING COMPOSITION
[75] Inventor: James F. Kinstle, Powell, Tenn.
[73] Assignee: Ford Motor Company, Dearborn, Mich.
[22] Filed: Aug. 6, 1973
[21] Appl. No.: 384,522

[52] U.S. Cl........ 260/885; 260/29.1 R; 260/30.4 R; 260/31.2 R; 260/32.8 R; 260/33.6 UA; 260/33.8 UA; 260/886; 204/159.16
[51] Int. Cl.$^2$............... C08L 33/08; C08L 35/06; C09D 3/81
[58] Field of Search.. 260/885, 886, 29.1 R, 31.2 R, 260/33.8 UA, 32.8 R, 30.4 R, 33.6 UA; 204/159.16

[56] References Cited
UNITED STATES PATENTS

| | | | |
|---|---|---|---|
| 3,008,920 | 11/1961 | Urchick | 260/885 |
| 3,189,663 | 6/1965 | Nozaki | 260/886 |
| 3,252,880 | 5/1966 | Magat et al. | 260/886 |
| 3,262,995 | 7/1966 | Huff et al. | 260/886 |
| 3,821,098 | 6/1974 | Garratt et al. | 204/159.16 |
| 3,857,768 | 12/1974 | Kaglya et al. | 204/159.16 |

Primary Examiner—Allan Lieberman
Attorney, Agent, or Firm—Roger L. May; Keith L. Zerschling

[57] ABSTRACT

A paint that provides a textured surface when polymerized on a substrate by ionizing radiation which, exclusive of pigments and particulate mineral filler, consists essentially of a solution of a volatile, inert, organic solvent and a mixture including: (1) an alpha-beta olefinically unsaturated organic resin containing between about 0.5 and about 5 units of unsaturation per 1000 units of molecular weight; and (2) vinyl monomers in which the unsaturated organic resin has limited solubility, i.e., between about 1 and about 15 weight percent based on the weight of the monomer and which will copolymerize with the unsaturated organic resin upon exposure to ionizing radiation. The unsaturated organic resin and monomer are dissolved in the volatile, inert, organic solvent which is a mutual solvent for both the monomer and the prepolymer and applied to a substrate. After evaporation of the inert solvent, the coating is irradiated and polymerizes to form a textured coating.

7 Claims, No Drawings

ELECTRON BEAM CURABLE COATING COMPOSITION

BACKGROUND OF THE INVENTION

This invention relates to the art of coating and is concerned with a paint which when applied to an article of manufacture, particularly wood, metal, paper or shaped polymeric material, and polymerized thereon, produces a textured surface. More particularly, the invention relates to paint which may be cured or polymerized in situ on a substrate by ionizing radiation to form a textured surface coating.

The textured film coatings formed from the preferred embodiments of the paints of this invention may be applied to a substrate by conventional means, e.g., brushing, spraying, roller coating, etc., to an average thickness which is preferably in the range of from about 0.1 to about 4.0 mils depending on the substrate and the intended end use of the coated product and are cured at relatively low temperatures, e.g., between room temperature (20°–25°C) and the temperature at which significant vaporization of the most volatile polymerizable component is initiated, ordinarily between 20° and 70°C. The radiation energy is applied at dose rates of from about 0.1 to about 100 Mrads per second upon a preferably moving workpiece with the coating receiving a total dose in the range of from about 0.1 to about 100, preferably from about 1 to about 25 Mrads.

In this application, the term "paint" is meant to include finely divided pigment and/or particulate filler in a film-forming, resin comprising, binder solution or the binder solution without pigment and/or particulate filler. Thus, the binder solution which, after evaporation of volatile solvent, is ultimately converted to a weather and wear resistant textured film, can be all or virtually all that is used to form the film, or it can be a vehicle for pigmentary and/or particulate filler material.

The term "ionizing radiation" as employed herein means radiation having sufficient energy to remove an electron from a gas atom, forming an ion pair and hence radiation with energy of, or equivalent to, about 5,000 electron volts. The preferred method of curing films of the instant paint upon substrates to which they have been applied comprises subjecting such films to a beam of polymerization effecting electrons which is at its source of emission within the range of, or equivalent to, 150,000 to 450,000 electron volts. In this method of curing, it is preferred to employ a minimum of 25,000 electron volts per inch of distance between the radiation emitter and the workpiece where the intervening space is occupied by air. Adjustment is made for the resistance of the intervening gas which is preferably an oxygen-free, inert gas such as nitrogen, helium or combustion products of natural gas. It is, however, within the scope of the invention to effect polymerization using either that which is conventionally termed "high energy particle radiation" or "ionizing electromagnetic radiation."

The abbreviation "Mrads" as employed herein means 1 million Rads. The term "Rads" as employed herein means that dose of radiation which results in the absorption of 100 ergs of energy per gram of absorber, e.g., coating film. The electron emitting means may be a linear electron accelerator capable of producing a direct current potential in the range hereinbefore set forth. In such a device electrons are ordinarily emitted from a hot filament and accelerated through a uniform voltage gradient. The electron beam, which may be about ⅛ inch in diameter at this point is scanned in one direction to make a fanshaped beam and then passed through a metal window, e.g., a magnesium-thorium alloy of about 0.003 inch thickness.

There are a number of prior art paint formulations which comprise film-forming binder solutions which may be polymerized in situ on a variety of substrates by ionizing radiation. Exemplary of such prior art formulations are those disclosed by the following U.S. Pat. Nos.: 3,437,512; 3,437,513; 3,437,514; 3,528,844; 3,542,586; 3,542,587; 3,560,245; 3,577,262; 3,577,263; 3,577,264; 3,577,265; 3,585,065; 3,586,526; 3,586,527; 3,586,528; 3,586,529; 3,586,530; 3,586,531; 3,591,626; 3,595,687; 3,632,399; 3,632,400; 3,641,210; 3,642,939; 3,649,337; 3,650,811; 3,650,812; 3,650,813; 3,660,143; 3,660,144; 3,660,145; 3,660,371; and 3,679,447. Each of the paints disclosed by the above patents exhibits a number of desirable properties when cured in situ on a variety of substrates. However, each of the paints forms a relatively smooth film coating and is not suitable for providing a textured surface unless applied to a textured substrate or treated in some manner subsequent to application and prior to polymerization.

Since in many applications it is desirable to efficiently and economically provide a surface with an aesthetically pleasing textured coating of high quality, it is an object of this invention to provide a paint polymerizable by ionizing radiation which, upon polymerization, forms a textured surface without the necessity of using particular treatment techniques or textured substrates.

SUMMARY OF THE INVENTION

The paint formulation of this invention, which achieves the above object by forming a textured coating upon polymerization by ionizing radiation, on a pigment and particulate filler-free basis consists essentially of a solution of a volatile, inert organic solvent and a mixture containing: (1) between about 90 and about 10 parts, preferably between about 70 and about 30 parts, of an alpha-beta olefinically unsaturated organic resin; and (2) between about 10 and about 90 parts, preferably between about 30 and about 70 parts, of vinyl monomers in which the prepolymer has limited solubility, i.e., between about 1 and about 15 weight percent based on the weight of the monomer. The paint is prepared by dissolving the unsaturated organic resin in the volatile, inert organic solvent and then mixing the monomer therein, the solvent being a mutual solvent for both the resin and the monomer. On application of the paint to a substrate, the solvent evaporates, leaving the mixture which is cured by the ionizing radiation to form a textured film.

Alpha-Beta Olefinically Unsaturated Resin

The term "alpha-beta olefinically unsaturated resin" as used herein means an organic resin having olefinic unsaturation provided by an alpha-beta olefinically unsaturated monomer. More specifically "alpha-beta olefinic unsaturation" means olefinic unsaturation between the two terminal carbons of a polymer side chain. There are a number of known prior art methods of incorporating such alpha-beta olefinic unsaturation into a polymer useful in radiation polymerizable paints.

Exemplary of the available methods are those taught by the following U.S. Pat. No.: 3,437,514; 3,528,844; 3,542,586; 3,542,587; 3,641,210; and 3,642,939. The teachings of each of these patents relative to the provision of pendant alpha-beta olefinic unsaturation is incorporated herein by reference.

The particular alpha-beta olefinically unsaturated resin useful in this invention should contain at least about 50 mole percent, preferably from about 60 to about 95 mole percent, of a hydrocarbon monomer. Among the hydrocarbon monomers which are preferred are styrene monomers. The term "styrene monomer" as used herein is intended to mean styrene monomers and substituted styrene monomers such as vinyl toluene, alpha-methyl styrene, t-butyl styrene and chlorostyrene.

Up to 50 mole percent, preferably between about 5 and about 40 mole percent, of the monomer units of the alpha-beta olefinically unsaturated resin may be acrylic monomers. The term "acrylic monomer" as used herein means an alpha-beta monounsaturated monocarboxylic acid or esters thereof and includes, but not by way of limitation: acrylic acid, alkylacrylic acids, e.g., methacrylic acid; monohydric and polyhydric alcohol esters of acrylic and alkylacrylic acids; other oxygenated derivatives of acrylic acid and alkylacrylic acids, e.g., glycidyl methacrylate, hydroxyethyl methacrylate, hydroxypropyl methacrylate, etc.; halogenated derivatives of the same, e.g., chloroacrylic acid and esters thereof; and diacrylates and dimethacrylates, e.g., ethylene glycol diacrylate.

The alpha-beta olefinically unsaturated resins formed from the above monomers and useful in this invention contain between about 0.5 and about 5 units, preferably between about .5 and about 3 units, of olefinic unsaturation per 1000 units of molecular weight. These resins have average molecular weights in excess of 1000 and may have molecular weights as high as 1,000,000, advantageously in the range of about 5,000 to about 50,000, and preferably in the range of from about 5,000 to about 25,000, particularly in those applications in which the paint is applied by conventional spray methods.

Vinyl Monomers

The term "vinyl monomer" as used herein refers to a monomeric compound having a

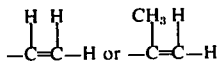

terminal group and excludes allylic compounds. The vinyl monomers useful in the paint of this invention must be polymerizable with the above-discussed alpha-beta olefinically unsaturated resins upon exposure to ionizing radiation. Also, in order to achieve the desired textured surface upon curing, the vinyl monomers must be selected such that the alpha-beta olefinically unsaturated resins discussed above have limited solubility in the same when the two components are mixed together. While the monomer or mixture of monomers employed should at least swell the alpha-beta olefinically unsaturated prepolymer, said prepolymer should be soluble in said monomer only to the extent of between about 1 and about 15 weight percent based on the weight of said monomer. Preferably, at least 80 weight percent of the vinyl monomers employed are polar in nature. Exemplary of suitable polar monomers are: hydroxyl bearing esters of $C_2$–$C_8$ aliphatic alcohols and acrylic or alkylacrylic acids, e.g., hydroxyethyl acrylate, hydroxyethyl methacrylate, hydroxypropyl acrylate, hydroxypropyl methacrylate, hydroxybutyl acrylate, hydroxybutyl methacrylate, etc.; acrylic acid; alkylacrylic acids; acrylamide; methacrylamide; methacryloxyethyl phosphate; acrylonitrile, methacrylonitrile; 2-acrylamido-2-methylpropanesulfonic acid; and halogenated alkyl acrylates such as chloroethyl acrylate.

Up to 20 weight percent of the total monomer component mixture may consist of other monomers which would normally serve as a better solvent for the alpha-beta olefinically unsaturated resin, the important consideration being that the alpha-beta olefinically unsaturated resin have limited solubility in the monomer solution of between about 1 and about 15 weight percent based on the total weight of the monomer. Among these additional monomers which may be employed are various monovinyl, divinyl, trivinyl and tetravinyl monomers known in the art and taught by the above-listed patents as being useful in paints curable by ionizing radiation. Among these vinyl compounds are both vinyl hydrocarbons and acrylic monomers including, by way of example, and not by way of limitation: esters of acrylic or methacrylic acid and $C_1$–$C_8$ monohydric alcohols, e.g., methyl methacrylate, butyl methacrylate, butyl acrylate, 2-ethylhexyl acrylate, cyclohexyl acrylate, etc.; esters of acrylic or methacrylic acid and $C_2$–$C_8$ dihydric or polyhydric alcohols such as 1,6 hexane diol diacrylate, neopentyl glycol diacrylate, 1,3 butylene dimethacrylate, ethylene glycol diacrylate, trimethylol-propane triacrylate, pentaerythritol triacrylate, pentaerythritol tetracrylate, etc.; divinyl benzene; and monovinyl hydrocarbons, e.g., styrene, methyl substituted styrenes such as alpha-methyl styrene, vinyl toluene, t-butyl styrene, chlorostyrene, etc. Exemplary of still further monomers which may be included are the divinyl and tetravinyl compounds disclosed in U.S. Pat. Nos.: 3,586,526; 3,586,527; 3,586,528; 3,586,529; 3,598,530; 3,586,531; 3,591,626; and 3,595,687. The divinyl and tetravinyl compounds of these patents are generally formed by reacting a mono or diepoxide with acrylic or methacrylic acid and then reacting the resultant condensation product with a vinyl unsaturated halide.

Organic Solvent

The volatile inert organic solvent component of the novel paint compositions of this invention must be selected such that it serves as a mutual solvent for both the alpha-beta olefinically unsaturated resin and the vinyl monomer components of the mixture. Preferred organic solvents, given by way of example and not by way of limitation, are those selected from the group consisting of: benzene; toluene; tetrahydrofuran; dioxane; methylethyl ketone; butyl acetate; methylisobutyl ketone; lower chlorinated aliphatic hydrocarbons such as methylene chloride, chloroform, ethylene dichloride, trichloroethylene and trichloroethane; and mixtures thereof.

The amount of solvent employed will, of course, vary with the particular solvent, the particular mixture being dissolved, the manner of application of the paint, the desired viscosity, etc. The solvent does not polymerize with the mixture components discussed above, but rather evaporates from the surface to which the paint is applied prior to polymerization. Thus, the solvent must not only be inert with respect to the reactive components, but also must be substantially more volatile than the monomeric constituents of the paint.

It will be appreciated by those skilled in the art that various combinations of alpha-beta olefinically unsaturated resins and vinyl monomers in various solvents may be employed within the scope of this invention. Therefore, the above-listed specific materials and the following examples are presented merely to demonstrate various possible combinations falling within the scope of the invention and are not intended by way of limitation.

EXAMPLE I

A reactive prepolymer is prepared in two steps as follows:

Step I

A copolymer of styrene and acrylic acid is prepared by adding, over a 2-hour period, a solution of 91 grams of styrene, 9 grams acrylic acid and 1 gram azobisisobutyronitrile from an addition funnel to a nitrogen sparged flask containing 250 grams of refluxing, stirred tetrahydrofuran. Reflux conditions are maintained for 8 hours after addition is complete, the solution is concentrated by distillation, and the copolymer is isolated by precipitation in methanol, filtered, and dried.

Step II

The styrene-acrylic acid copolymer is dissolved in xylene (15 weight percent copolymer). Slightly more than the stoichiometric amount of glycidyl methacrylate is added (1.05 moles of glycidyl methacrylate per 1.0 moles acrylic acid units), along with a catalytic amount of tetraethylammonium chloride (0.02 moles catalyst per mole of acrylic acid). Hydroquinone is added to inhibit free radical polymerization of glycidyl methacrylate (0.4 gms. hydroquinone per mole of glycidyl methacrylate). This solution is maintained at gentle reflux under nitrogen with continuous stirring until at least 90% of the acrylic acid units are reacted (degree of reaction followed by acid number titration). The final prepolymer is isolated from its xylene solution by freeze drying.

A coating composition is prepared as follows: A 50 gm. portion of prepolymer is dissolved in 50 gms. of methylene chloride and 50 gms. of 2-hydroxyethyl acrylate is added. This homogeneous solution is applied to a substrate, the methylene chloride allowed to evaporate, and the wet film irradiated under typical electron beam curing conditions (275 kilovolts, 42 milliamps, oxygen-free atmosphere). At absorbed dose levels ranging from less than 1 Mrad to over 10 Mrad a randomly textured or grained crosslinked coating is formed.

EXAMPLE II

The procedure of Example I is followed, except that 70 gms. of prepolymer is dissolved in 65 gms. of methylene chloride and 30 gms. of hydroxyethyl acrylate is added. Again, a randomly textured crosslinked coating is the final product.

EXAMPLE III

The procedure of Example I is repeated except that 45 gms. of 2-hydroxypropyl acrylate and 5 gms. of divinylbenzene are substituted for the hydroxyethyl acrylate. The coating composition is sprayed on a wood surface and cured by electron beam irradiation.

EXAMPLE IV

The procedure of Example I is repeated except that the hydroxyethyl acrylate is replaced with 50 gms. of 2-hydroxybutyl methacrylate and the resin mixture is dissolved in methylethyl ketone. The coating composition is applied to a shaped polymeric substrate and cured by electron beam irradiation.

EXAMPLE V

The procedures of Example I are repeated except that 30 gms. of prepolymer is dissolved in 30 gms. of methylene chloride and 70 gms. of hydroxyethyl acrylate is added. Again, a randomly textured crosslinked coating is the final product.

EXAMPLE VI

The procedure of Example I is repeated except that 30 gms. of 2-hydroxyethyl methacrylate is substituted for the hydroxyethyl acrylate and the resin mixture is dissolved in trichloroethylene. The coating composition is applied to a glass substrate and cured by electron beam irradiation.

EXAMPLE VII

The procedure of Example I is repeated except that the 2-hydroxyethyl acrylate is replaced with 25 gms. of 2-hydroxybutyl acrylate and 5 gms. of ethyl acrylate. The resin mixture is dissolved in tetrahydrofuran and sprayed on a metal substrate prior to curing by electron beam irradiation.

EXAMPLE VIII

The procedures of Example I are followed, except that 4.0 gms. of azobis (isobutyronitrile) is used in the copolymer synthesis step. Again, a randomly textured crosslinked coating is the final product.

EXAMPLE IX

The procedure of Example I is repeated, except that the resin mixture is dissolved in methylisobutyl ketone. The coating is roller coated on a wood substrate and cured by ionizing radiation.

EXAMPLE X

The procedures of Example I are followed, except that 0.25 gms. azobis (isobutyronitrile) is used in the copolymer synthesis step. Again, a randomly textured crosslinked coating is the final product.

EXAMPLE XI

The procedures of Example I are followed, except that an equimolar amount of vinyl toluene is used in place of the styrene monomer in the preparation of the prepolymer. The coating is applied to a glass substrate and cured by electron beam irradiation.

EXAMPLE XII

The procedure of Example I is repeated, except that an equimolar amount of chlorostyrene is substituted for the styrene monomer in the prepolymer.

EXAMPLE XIII

The procedure of Example I is followed, except that an equimolar amount of alpha-methyl styrene is substituted for the styrene in the prepolymer and the 2- hydroxyethyl acrylate is replaced with a mixture of 35 gms. of hydroxypropyl acrylate and 5 gms. of ethyl acrylate. The coating composition is applied to a metal substrate and cured by electron beam irradiation.

EXAMPLE XIV

The procedures of Example I are followed except that glycidyl acrylate is used in place of glycidyl methacrylate in the prepolymer synthesis step. Again, a randomly textured crosslinked coating is the final product.

EXAMPLE XV

The coating is prepared in accordance with the procedures of Example I except that the prepolymer employed contains 55 mole percent of styrene with the remainder of the monomers being ethyl acrylate and a glycidyl methacrylate adduct of methacrylic acid. The coating solution is supplied to a polymeric substrate and cured by electron beam irradiation to form a textured surface.

EXAMPLE XVI

The procedures of Example I are followed except that the prepolymer employed contains 75 mole percent of vinyl toluene with the remaining mole percent being ethyl methacrylate and a glycidyl methacrylate adduct of methacrylic acid. The coating is applied to a glass substrate and cured by electron beam irradiation to form a textured surface.

EXAMPLE XVII

The procedures of Example I are followed except that the prepolymer employed contains 80 mole percent of alpha-methyl styrene monomer with the remainder of the monomers being ethyl acrylate and a glycidyl acrylate adduct of methacrylic acid. The coating composition is applied to a metal substrate and cured by electron beam irradiation to form a textured surface.

EXAMPLE XVIII

The procedure of Example I is repeated with the exception that the prepolymer-monomer mixture is dissolved in an inert solvent mixture of 50 parts toluene, 30 parts methylene chloride, 10 parts butyl acetate and 10 parts methylethyl ketone.

EXAMPLE XIX

The procedure of Example I is repeated with the exception that the prepolymer-monomer mixture is dissolved in an inert solvent mixture of 40 parts tetrahydrofuran, 40 parts methylene chloride, 10 parts methylethyl ketone and 10 parts butyl acetate.

EXAMPLE XX

The procedure of Example I is repeated with the exception that the prepolymer-monomer mixture is dissolved in a solvent mixture of 50 parts tetrahydrofuran, 30 parts toluene and 20 parts methylethyl ketone.

EXAMPLE XXI

The procedure of Example I is followed, except that 70 grams of prepolymer is dissolved in 65 gms. of dioxane and 30 gms. of a monomer mixture comprising 25 gms. of acrylic acid and 5 gms. of pentaerythritol triacrylate is added.

EXAMPLE XXII

The procedure of Example I is followed, except that 80 gms. of prepolymer is dissolved in 60 gms. of ethylene chloride and 20 gms. of a mononer mixture comprising 18 gms. of methacryloxyethyl phosphate and 2 gms. of ethylene glycol diacrylate is added.

EXAMPLE XXIII

The procedure of Example I is followed, except that an equimolar amount of t-butyl styrene is substituted for the styrene in the prepolymer.

Alternative Paint Composition

The principals of this invention are also applicable to the types of electron beam curable paints disclosed in application Ser. No. 295,649, filed Oct. 6, 1972. These paints comprise monounsaturated monomers and a saturated prepolymer or organic resin having as a constituent monomer a compound of the formula

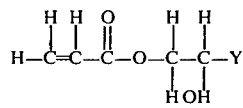

where Y is $H, CH_3$ or $C_2H_5$. Crosslinking occurs in paints made in accordance with the teachings of that application through the hydroxyl functionality on the above-mentioned constituent monomer rather than through alpha-beta olefinic unsaturation as is the case of the electron beam curable coatings discussed above. By preparing such prepolymers with greater than 50 mole percent, preferably 60 – 95 mole percent, of hydrocarbon monomers as discussed above and then employing monounsaturated monomers in which the prepolymer is only slightly soluble, i.e., 1 – 15 weight percent based on the weight of the monomer, it is also possible to produce randomly textured coatings.

It will be understood by those skilled in the art that modifications can be made within the foregoing examples and within the scope of the invention as hereinbefore described and hereafter claimed.

I claim:

1. A paint adapted to form a textured surface when polymerized in situ on a substrate by ionizing radiation which, exclusive of pigments and particulate mineral filler, consists essentially of a solution of a volatile, inert organic solvent and a mixture containing:
   1. between about 90 and about 10 parts by weight of an alpha-beta olefinically unsaturated resin having an average molecular weight above 1000, containing between about 0.5 and about 5 units of alpha-beta olefinic unsaturation per 1000 units of molecular weight and being a copolymer of
      a. about 50 to about 95 mole percent of styrene monomers selected from the group consisting of styrene, vinyl toluene, alpha-methyl styrene, t-butyl styrene and chlorostyrene and
      b. about 5 to about 50 mole percent of acrylic monomers; and
   2. between about 10 and about 90 parts by weight of vinyl monomers polymerizable with said unsaturated organic resin upon exposure to ionizing radiation, said unsaturated organic resin being soluble in said monomer only to the extent of between about 1 and about 15 weight percent based on the weight of said monomers.

2. A paint in accordance with claim 1 wherein at least about 80 weight percent of said vinyl monomers are polar monomers in which said unsaturated organic resin is soluble to the extent of less than about 15 weight percent based on the weight of said monomers.

3. A paint in accordance with claim 2 wherein said polar monomers are selected from the group consisting of: hydroxyl bearing esters of $C_2$–$C_8$ aliphatic alcohols and acrylic or alkyl acrylic acids; acrylic acid; alkylacrylic acids; acrylamide; methacrylamide; methacryloxyethyl phosphate; acrylonitrile; methacrylonitrile; 2 acrylamido-2-methyl propanesulfonic acid; halogenated alkyl acrylates; and mixtures thereof.

4. A paint in accordance with claim 1 wherein said acrylic monomers are selected from the group consisting of: acrylic acid; alkylacrylic acids; monoesters of acrylic acid and monohydric or polyhydric alcohols; monoesters of alkylacrylic acids and monohydric or polyhydric alcohols, glycidyl acrylate; glycidyl methacrylate; halogen substituted acrylic acid; halogen substituted alkylacrylic acids; halogen substituted monoesters of acrylic acid and monohydric or polyhydric alcohols; and halogen substituted monoesters of alkylacrylic acids and monohydric or polyhydric alcohols.

5. A paint adapted to form a textured surface when polymerized in situ on a substrate by ionizing radiation which, exclusive of pigments and particulate mineral filler, consists essentially of a solution of a volatile, inert organic solvent and a mixture containing:
  1. between about 70 and about 30 parts by weight of an alpha-beta olefinically unsaturated organic resin having an average molecular weight above 1,000, containing between about .5 and about 5 units of pendant alpha-beta olefinic unsaturation per 1,000 units of molecular weight and being a copolymer of
    a. about 60 to about 95 mole percent of styrene monomers selected from the group consisting of styrene, vinyl toluene, alpha-methyl styrene, t-butyl styrene and chlorostyrene and
    b. about 5 to about 40 mole percent of acrylic monomers; and
  2. between about 30 and about 70 parts by weight of vinyl monomers which swell said unsaturated organic resin and which are crosslinkable with said unsaturated organic resin upon exposure to ionizing radiation, said unsaturated organic resin being soluble in said monomers only to the extent of between about 1 and about 15 weight percent based on the weight of said monomers.

6. A paint in accordance with claim 5 wherein at least about 80 weight percent of said vinyl monomers are selected from the group consisting of: hydroxyl bearing esters of $C_2$–$C_8$ aliphatic alcohols and acrylic or alkylacrylic acids; acrylic acid; alkyl acrylic acids; acrylamide; methacrylamide; methacryloxyethyl phosphate; acrylonitrile; methacrylonitrile; 2-acrylamido-2-methylpropanesulfonic acid; halogenated alkyl acrylates; and mixtures thereof.

7. A paint in accordance with claim 5 wherein said acrylic monomers are selected from the group consisting of: acrylic acid; alkylacrylic acids; monoesters of acrylic acid and monohydric or polyhydric alcohols; monoesters of alkylacrylic acids and monohydric or polyhydric alcohols; glycidyl acrylate; glycidyl methacrylate; halogen substituted acrylic acids; halogen substituted alkylacrylic acids; halogen substituted monoesters of acrylic acid and monohydric or polyhydric alcohols; and halogen substituted monoesters of alkylacrylic acids and monohydric or polyhydric alcohols.

* * * * *